US006998823B2

(12) United States Patent
Albertson

(10) Patent No.: US 6,998,823 B2
(45) Date of Patent: Feb. 14, 2006

(54) METHOD OF REDUCING ENGINE BELT NOISE

(75) Inventor: William C. Albertson, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 176 days.

(21) Appl. No.: 10/635,208

(22) Filed: Aug. 6, 2003

(65) Prior Publication Data

US 2005/0029991 A1 Feb. 10, 2005

(51) Int. Cl.

| | |
|---|---|
| ***H02P 9/04*** | (2006.01) |
| ***F16H 7/12*** | (2006.01) |
| ***G06F 19/00*** | (2006.01) |
| ***F02B 75/32*** | (2006.01) |

(52) U.S. Cl. ........................ 322/38; 474/135; 701/115; 123/195 A

(58) Field of Classification Search ................ 290/4 B; 123/195, 90.16, 90.15, 90.31, 192.1, 198 F; 474/135, 37, 28; 192/103 R; 701/115; 322/38
See application file for complete search history.

(56) References Cited

U.S. PATENT DOCUMENTS

| | | | | |
|---|---|---|---|---|
| 4,839,576 | A * | 6/1989 | Kaneyuki et al. | 322/25 |
| 4,885,493 | A | 12/1989 | Gokhale | 310/190 |
| 5,041,772 | A * | 8/1991 | Earleson et al. | 318/375 |
| 5,144,220 | A * | 9/1992 | Iwatani et al. | 322/28 |
| 5,448,154 | A * | 9/1995 | Kanke et al. | 322/28 |
| 5,730,094 | A | 3/1998 | Morris | 123/192.1 |
| 6,404,163 | B1 | 6/2002 | Kapsokavathis et al. | 320/104 |
| 6,531,849 | B2 * | 3/2003 | Nakamura et al. | 322/27 |
| 6,700,277 | B2 * | 3/2004 | Kusase et al. | 310/184 |
| 6,830,524 | B2 * | 12/2004 | Tamai | 474/134 |
| 6,834,228 | B2 * | 12/2004 | Serkh et al. | 701/115 |
| 2003/0083803 | A1 * | 5/2003 | Serkh et al. | 701/115 |
| 2003/0141123 | A1 * | 7/2003 | Sugiura et al. | 180/65.2 |

* cited by examiner

*Primary Examiner*—Darren Schuberg
*Assistant Examiner*—Julio Gonzalez
(74) *Attorney, Agent, or Firm*—Christopher DeVries

(57) ABSTRACT

A method is provided for reducing belt-related noise in an engine, wherein the belt is engaged with an alternator pulley connected with an alternator, and a crankshaft pulley connected to an engine crankshaft. The method includes controlling rotor current in the alternator in a manner to selectively synchronize variations in rotor speed with variations in crankshaft speed, thereby preventing large variations in belt tension to reduce noise.

16 Claims, 3 Drawing Sheets

METHOD OF REDUCING ENGINE BELT NOISE

TECHNICAL FIELD

The present invention relates to a method of controlling alternator rotor current in a manner to synchronize rotor speed with crankshaft speed to reduce belt noise on an engine.

BACKGROUND OF THE INVENTION

An accessory drive belt for an engine is driven by the crankshaft and may be operatively connected by pulleys to an air pump, an air conditioning compressor, a water pump, a power steering pump, and an alternator for driving these devices. The pulley associated with the alternator is much smaller than the pulley associated with the crankshaft, so the alternator rotor rotates at a relatively high speed. Also, the alternator rotor has a relatively high mass, which results in a high rotational inertia due to the high speed.

The speed profile of the crankshaft may vary significantly during engine cycles, particularly when the engine has a small number of active cylinders. Accordingly, due to the rotational inertia of the alternator rotor, significant positive or negative tension may occur in the belt between the crankshaft and the alternator as speed variations occur in the crankshaft. As a result of these tension variations in the belt, belt noise or belt chirp may occur. Other problems include vibration and reduced durability of the drive belt system.

When engine cylinders are deactivated, this belt noise problem may be exacerbated as the rotational inertia of the alternator rotor reacts to greater changes in crankshaft speed. Because certain engine cylinders have been deactivated, the time lapse between changes in acceleration and deceleration of the crankshaft result in greater amplitude of velocity changes in the crankshaft, which can cause significant changes in tension in the drive belt as inertia in the alternator rotor is overcome.

These belt noise problems may also occur in drivetrain systems having a high overdrive ratio, or in diesel engines.

SUMMARY OF THE INVENTION

The inventor has recognized that the electrical alternator has the ability to create a variable and controllable "braking" force (i.e., an electro-magnetic force opposing rotation) that can work to counter or, effectively, enhance its own rotational inertia. This variable braking force can be used to attenuate the effects of increased variations in crankshaft speed on the accessory drive system when an engine is operated in cylinder deactivation mode, or in a diesel engine or a drivetrain system with a high overdrive ratio.

Accordingly, the invention provides a method of reducing belt related noise in an engine, wherein the belt is engaged with an alternator pulley connected to an alternator, and a crankshaft pulley connected to an engine crankshaft. The method includes controlling rotor current in the alternator in a manner to selectively synchronize variations in rotor speed with variations in crankshaft speed, thereby preventing large variations in belt tension to reduce noise. Rotor current is increased to increase braking of the rotor when the crankshaft is decelerating, and rotor current is decreased to decrease rotor braking when the crankshaft is accelerating. This control is preferably provided when cylinders are deactivated in the engine.

Specifically, the rotor current is controlled by a controller which monitors and varies the voltage applied to the alternator. The controller may also monitor engine speed, cylinder deactivation mode, crankshaft synchronization with the alternator rotor, system voltage, and intake manifold pressure. This controller may be a dedicated alternator controller; or it may be integrated into the engine control module, or other controller.

Another aspect of the invention provides a system for reducing belt related noise in the engine. The system includes an alternator operatively connected to an engine crankshaft by a belt. The alternator includes a rotor. A controller, as described above, is operative to control rotor current in a manner to selectively synchronize variations in rotor speed with variations in crankshaft speed, thereby preventing large variations in belt tension to reduce noise.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figure 1:
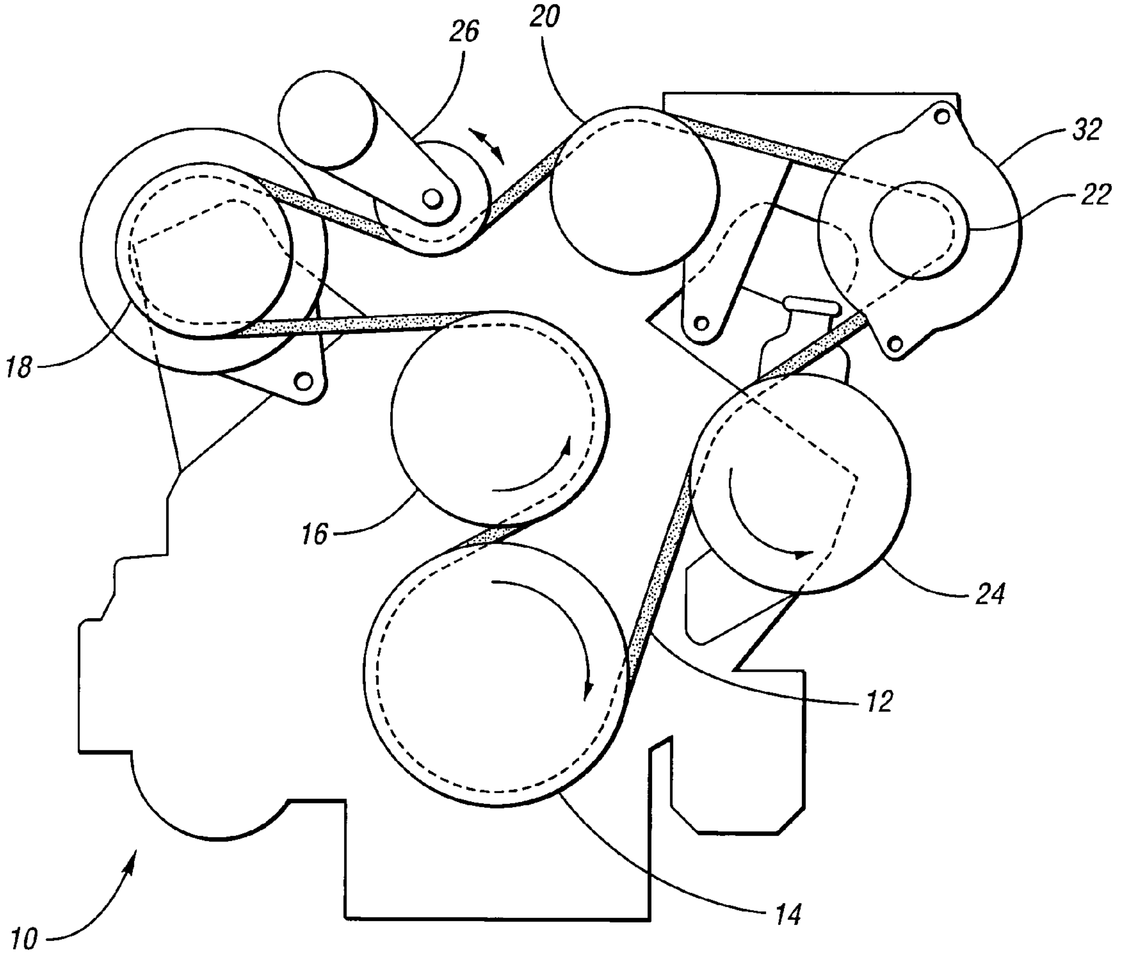
FIG. 1 shows a schematic end view of an engine including a typical accessory drive layout.

FIG. 1 shows a schematic end view of an engine 10, illustrating the accessory drive layout of the engine. As shown, the engine includes a belt 12 which is driven by a crankshaft pulley 14. Actuation of the belt 12 by the crankshaft pulley 14 drives various accessory systems on the engine 10. The belt 12 drives the water pump pulley 16, the air conditioner compressor pulley 18, the air pump pulley 20, the alternator/generator pulley 22, and the power steering pump pulley 24. A spring loaded belt tensioner 26 is provided to maintain tension in the belt 12.

The belt tensioner 26 is sufficient to maintain a predetermined level of tension within the belt during normal operating conditions of the engine. However, when cylinders are deactivated, the frequency of crankshaft speed variations is significantly reduced, and the amplitudes of variations are significantly increased, which results in significant tension variations in the belt 12 as crankshaft speed variations are reacted against by the alternator inertia.

Figure 3:
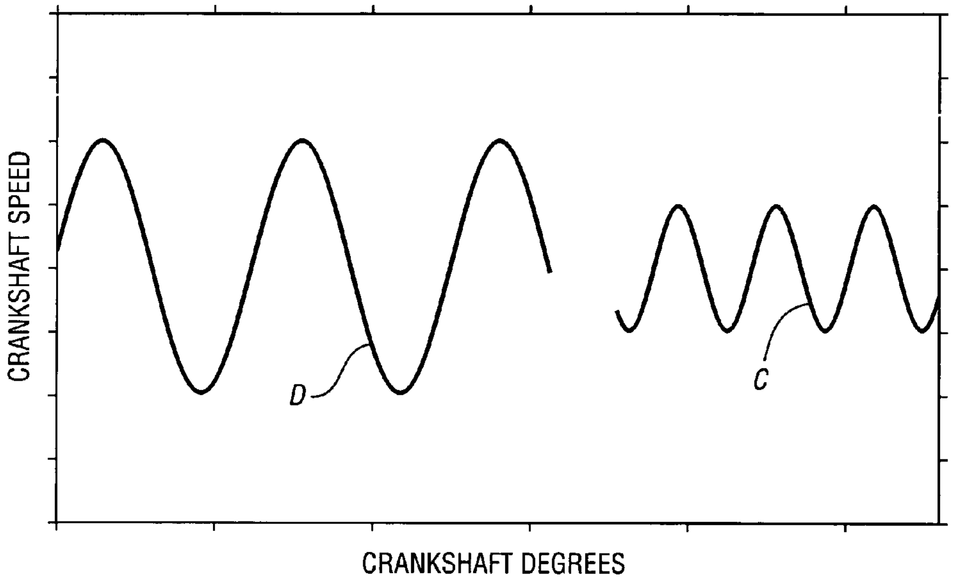
FIG. 3 shows a graphical illustration of crankshaft speed versus crankshaft degrees for an engine.

FIG. 3 shows a graphical illustration of crankshaft speed versus crankshaft degrees wherein profile C illustrates crankshaft speed variations during normal mode (all cylinders active), and profile D illustrates crankshaft speed during cylinder deactivation. As shown, the amplitude of speed variations in the crankshaft increases considerably when cylinders are deactivated as a result of the reduced frequency of the engine cycle events.

On a typical accessory drive system for an engine, the electrical alternator is driven at speeds of approximately 2.5 times that of the crankshaft. As described previously, this relatively high speed along with the alternator's high rotating mass produce a flywheel affect at the alternator because of rotational inertia. As shown in FIG. 3, the crankshaft does not run at constant speed, but varies with respect to a nominal speed due to the various events in the engine cycle. In a multi-cylinder engine operating under the full complement of cylinders, the flywheel effect of the alternator on accessory drive belt tension does not normally cause a problem. This is because the engine firing frequency is high and the instantaneous crankshaft speed variation is low. However, during cylinder deactivation the frequency of crankshaft speed variations is typically halved and the amplitudes are almost doubled, as illustrated in FIG. 3. Because of alternator inertia and compliance of the drive belt system, the crankshaft and alternator can no longer track each other's speed variations and often work in opposition. This creates excessive variations in belt tension that result in noise, vibration and reduced durability of the drive belt system. This situation becomes more apparent as engines with fewer numbers of cylinders utilize cylinder deactivation. With fewer numbers of active cylinders, the speed impulses in the accessory drive appear at lower frequency and the alternator's flywheel affect becomes magnified.

Accordingly, the invention controls the alternator in a manner to selectively synchronize variations in alternator rotor speed with variations in crankshaft speed, thereby preventing large variations in belt tension to reduce noise associated with the belt. Specifically, the electrical alternator is used to create a variable and controllable braking force to counter the affects of its own rotational inertia. This variable braking force is used to attenuate the affects of increased variations in crankshaft speed on the accessory drive system when the engine is operated in cylinder deactivation mode.

The alternator's braking force is created by the interaction of the rotor's magnetic field and stator. This force is variable as a function of rotor speed and rotor current. In practice, there is almost always rotor current flowing. Adjustments in the rotor current can be used to control the amount of force opposing rotation. When this variable rotor current is synchronized in time and amplitude with engine events, the alternator rotational speed can be made to more closely track the variations in crankshaft speed and thus reduce variations in drive belt tension. Specifically, braking is increased when the crankshaft slows down, and braking is decreased when the crankshaft speeds up.

Figure 2:
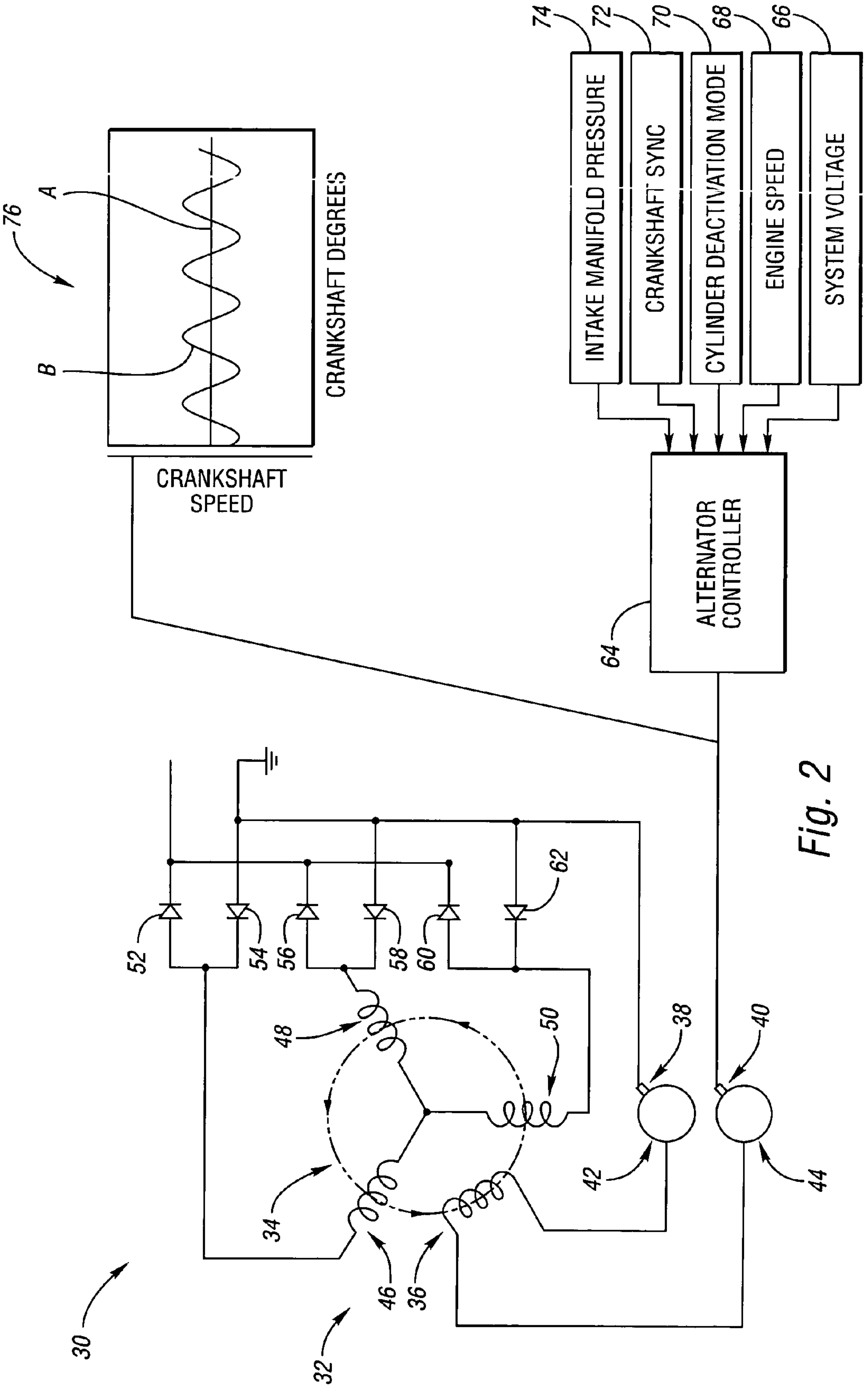
FIG. 2 shows a schematic illustration of a control system for controlling an alternator to reduce belt noise in accordance with the invention.

Turning to FIG. 2, a system 30 is shown for reducing belt related noise in the engine. The system 30 includes the alternator 32 (also shown in FIG. 1) which includes the stator 34 and rotor 36. In the alternator 32, a voltage is applied across the rotor 36 via the brushes 38, 40 and slip rings 42, 44 to cause a current to flow through the windings of the rotor 36. When the DC voltage is applied to the coils or windings of the rotor 36, the rotor 36 becomes an electromagnet. When the rotor is rotated, the magnetic field induces alternating current in the stationary coils of the stator 34. The alternating current from the three zones 46, 48, 50 of the stator are then converted to DC current by the diodes 52, 54, 56, 58, 60, 62. This DC current is used to charge the battery and to drive electrical systems of the vehicle.

As further shown in FIG. 2, the system 30 also includes the alternator controller 64, which may be a dedicated alternator controller within the alternator, or may be incorporated into the engine control module or other controller. As inputs, the alternator controller 64 receives the system voltage 66 (i.e., the voltage of the vehicle electrical system), engine speed 68, cylinder deactivation mode 70 (i.e., whether cylinders have been deactivated), crankshaft synchronization 72 (i.e., timing of crankshaft rotation with rotor current), and intake manifold pressure 74 (because crankshaft speed variation is proportional to engine load). Based upon the inputs 66, 68, 70, 72, 74, the alternator controller 64 determines a voltage profile 76 to be input to the alternator 32 to generate appropriate current in the rotor 36 to achieve the desired braking force of the alternator 32. Under the normal mode, or non-cylinder deactivated mode, a flat voltage profile A is provided to the alternator 32, and during cylinder deactivation, the varying profile B is provided to the alternator 32 to provide the desired braking force to synchronize rotor speed with crankshaft speed.

The alternator rotor current modulation during cylinder deactivation can be applied in a manner so that the overall output level of the alternator is not changed. The cylinder deactivated rotor current is more variable in amplitude around the mean value and also high enough in frequency to produce the same overall level as in the normal mode. For example, in a six cylinder engine deactivated to three operating cylinders, the frequency is 1.5 times the crankshaft speed, and in an eight cylinder engine deactivated to four cylinder, the frequency is 2 times the crankshaft speed.

Profile B, shown in FIG. 2, is selected to synchronize frequency of rotor current with the engine cycle events (i.e., crankshaft speed variations).

Figure 4:
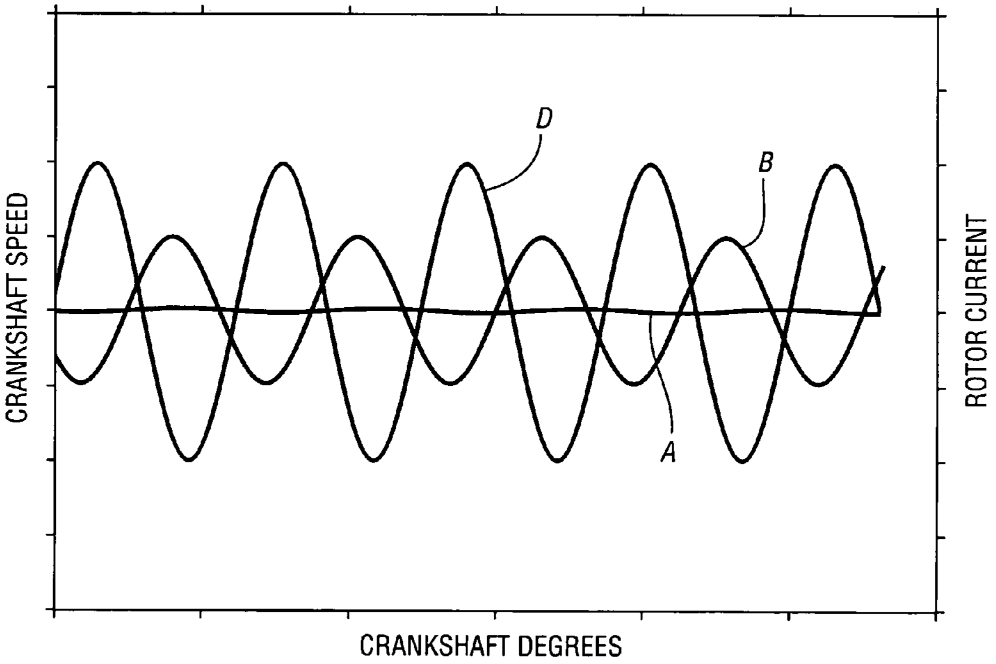
FIG. 4 shows a graphical illustration of crankshaft speed and rotor current versus crankshaft degrees in accordance with the invention.

FIG. 4 shows a graphical illustration of a suggested timing of the variations in rotor current relative to crankshaft speed variations. As illustrated by the rotor current profile B, when the crankshaft speed profile D is decreasing (i.e. the crankshaft is decelerating), the rotor current profile B increases to increase braking of the rotor to synchronize rotor speed with crankshaft speed. Similarly, when the crankshaft speed profile D is increasing, the rotor current profile B is simultaneously decreased to reduce braking of the rotor, thereby reducing belt tension caused by differences in speed between the rotor pulley and crankshaft pulley. Again, profile A represents rotor current during normal operating conditions (all cylinders active).

The present invention may find application in any engine system that exhibits high periodic instantaneous crankshaft speed variations. Examples include a drivetrain system with a high overdrive ratio, or diesel engines.

While the best mode for carrying out the invention has been described in detail, those familiar with the art to which this invention relates will recognize various alternative designs and embodiments for practicing the invention within the scope of the appended claims.

What is claimed is:

1. A method of reducing belt-related noise in an engine, wherein the belt is engaged with an alternator pulley connected to an alternator, and a crankshaft pulley connected to an engine crankshaft, the method comprising:

controlling rotor current in the alternator in a manner to selectively synchronize variations in rotor speed with variations in crankshaft speed, thereby preventing large variations in belt tension to reduce noise.

2. The method of claim 1, wherein said controlling comprises increasing rotor current to increase rotor braking when the crankshaft is decelerating, and decreasing rotor current to decrease rotor braking when the crankshaft is accelerating.

3. The method of claim 2, wherein said controlling is performed when selected cylinders of the engine are deactivated.

4. The method of claim 2, wherein said controlling rotor current comprises controlling voltage applied to the alternator in a manner to control rotor current.

5. The method of claim 3, wherein said controlling further comprises monitoring system voltage, engine speed, cylinder deactivation mode, crankshaft synchronization with alternator rotor, and intake manifold pressure.

6. The method of claim 5, wherein said controlling is performed by a dedicated alternator controller.

7. The method of claim 1, wherein said controlling comprises inputting a varying voltage profile to the alternator, said varying voltage profile being substantially synchronized with a crankshaft speed profile.

8. A method of reducing belt-related noise during cylinder deactivation in an engine, wherein the belt is engaged with an alternator pulley connected to an alternator having a rotor, and a crankshaft pulley connected to an engine crankshaft, the method comprising:

monitoring whether cylinders have been deactivated in the engine; and if cylinders have been deactivated, then controlling rotor current in the alternator in a manner to selectively synchronize variations in crankshaft speed with variations in the amount of electro-magnetic force opposing rotation of the rotor, thereby preventing large variations in belt tension to reduce noise.

9. The method of claim 8, wherein said controlling comprises increasing rotor current to increase rotor braking when the crankshaft is decelerating, and decreasing rotor current to decrease rotor braking when the crankshaft is accelerating.

10. The method of claim 9, wherein said controlling rotor current comprises controlling voltage applied to the alternator in a manner to control rotor current.

11. The method of claim 9, wherein said controlling further comprises monitoring system voltage, engine speed, crankshaft synchronization with alternator rotor, and intake manifold pressure.

12. The method of claim 11, wherein said controlling function is performed by a dedicated alternator controller.

13. The method of claim 8, wherein said controlling comprises inputting a varying voltage profile to the alternator, said varying voltage profile being substantially synchronized with a crankshaft speed profile.

14. A system for reducing belt-related noise in an engine having cylinder deactivation, the system comprising:

an alternator operatively connected to an engine crankshaft by a belt, said alternator having a rotor; and a controller operative to control rotor current in a manner to selectively synchronize variations in rotor speed with variations in crankshaft speed when cylinders of the engine are deactivated, thereby preventing large variations in belt tension to reduce noise.

15. The system of claim 14, wherein the controller is operative to increase rotor current to increase braking of the rotor when the crankshaft is decelerating, and to decrease rotor current to decrease rotor braking when the crankshaft is accelerating.

16. A system for reducing belt related noises in an engine having cylinder deactivation, the system comprising:

an alternator having a rotor; and a controller for controlling said alternator's rotor current, whereby to prevent large variations in belt tension when selected cylinders of the engine are deactivated.

* * * * *